(12) United States Patent
De'Longhi et al.

(10) Patent No.: US 11,399,654 B2
(45) Date of Patent: Aug. 2, 2022

(54) COFFEE MACHINE AND METHOD FOR PREPARING A CUP OF COFFEE

(71) Applicant: De'Longhi Appliances S.R.L., Treviso (IT)

(72) Inventors: Giuseppe De'Longhi, Treviso (IT); Paolo Evangelisti, Bologna (IT)

(73) Assignee: De'Longhi Appliances S.R.L., Treviso (IT)

( * ) Notice: Subject to any disclaimer, the term of this patent is extended or adjusted under 35 U.S.C. 154(b) by 576 days.

(21) Appl. No.: 15/547,954

(22) PCT Filed: Jan. 26, 2016

(86) PCT No.: PCT/EP2016/051580
§ 371 (c)(1),
(2) Date: Aug. 1, 2017

(87) PCT Pub. No.: WO2016/124450
PCT Pub. Date: Aug. 11, 2016

(65) Prior Publication Data
US 2018/0020867 A1    Jan. 25, 2018

(30) Foreign Application Priority Data
Feb. 5, 2015 (IT) .......................... MI2015A000155

(51) Int. Cl.
*A47J 31/36* (2006.01)
*A47J 31/06* (2006.01)
(Continued)

(52) U.S. Cl.
CPC ............. *A47J 31/3619* (2013.01); *A23F 5/26* (2013.01); *A47J 31/057* (2013.01); *A47J 31/0647* (2013.01)

(58) Field of Classification Search
CPC ......... A47J 31/24; A47J 31/00; A47J 31/0647
(Continued)

(56) References Cited

U.S. PATENT DOCUMENTS 5,007,333 A     4/1991  Sager
8,931,399 B2 *  1/2015  Buttiker ................ A47J 31/461
                                                          99/290

(Continued)

FOREIGN PATENT DOCUMENTS

CN      101877981 B  * 10/2012  .......... A47J 31/3614
EP       2832269 A1    2/2015
WO    2014077687 A1    5/2014

OTHER PUBLICATIONS

International Search Report dated Jun. 2, 2016; International Application No. PCT/EP2016/051580; International Filing Date: Jan. 26, 2016; 3 pages.

(Continued)

*Primary Examiner* — Ibrahime A Abraham
*Assistant Examiner* — Spencer H. Kirkwood
(74) *Attorney, Agent, or Firm* — Blank Rome LLP

(57) ABSTRACT

A coffee machine including a controller, a boiler for heating a flow of infusion water, a movable infusion unit having an open infusion chamber connected to a dispensing line for dispensing the coffee infusion and having an ejection piston slidably supported therein in the infusion chamber, a supply line for supplying said flow of infusion water to the infusion unit, a closing piston engageable for closure of the infusion chamber. The controller can subject the infusion unit, prior to execution of the infusion process, to a first course of translational movement for closure of the infusion chamber by the closing piston, and to subject the infusion chamber and/or the ejection piston, following execution of the infusion process, to a second course of translational movement, (Continued)

for compression of the load of spent coffee grounds against the closing piston and for drainage of the liquid contained therein.

3 Claims, 5 Drawing Sheets

(51) Int. Cl.
*A47J 31/057* (2006.01)
*A23F 5/26* (2006.01)

(58) Field of Classification Search
USPC .................................. 99/283, 292, 289, 287
See application file for complete search history.

(56) References Cited

U.S. PATENT DOCUMENTS

| | | | | |
|---|---|---|---|---|
| 2007/0227363 | A1* | 10/2007 | Verna | A47J 31/54 |
| | | | | 99/279 |
| 2010/0236418 | A1* | 9/2010 | Sam | A47J 31/3614 |
| | | | | 99/287 |
| 2014/0150664 | A1* | 6/2014 | Corti | A47J 31/36 |
| | | | | 99/283 |
| 2014/0373724 | A1* | 12/2014 | De'Longhi | A47J 31/4403 |
| | | | | 99/289 R |

OTHER PUBLICATIONS

Written Opinion dated Jun. 2, 2016; International Application No. PCT/EP2016/051580; International Filing Date Jan. 26, 2016; 5 pages.

* cited by examiner

COFFEE MACHINE AND METHOD FOR PREPARING A CUP OF COFFEE

RELATED APPLICATIONS

This application is a U.S. national phase application of International Application No. PCT/EP2016/051580, filed Jan. 26, 2016; which application claims priority to Italy Application No. MI2015A 000155, filed Feb. 5, 2015. Each of the above-identified related applications are incorporated by reference.

FIELD OF USE

The present invention refers to a coffee machine and to a method for preparing a cup of coffee.

BACKGROUND OF THE INVENTION

Many machines for making drip coffee or American coffee currently available on the market essentially comprise a water boiler, a percolating chamber, where a paper filter can be positioned and the load of loose coffee grounds being placed on the filter, and a carafe for collecting the percolated coffee, the carafe being positioned below the filter.

The boiler supplies water to the percolating chamber, where by the effect of its own weight the water percolates through the load of loose coffee grounds and the resulting percolated coffee is collected in the carafe.

These drip coffee machines offer the undeniable advantage of being simple in construction with extremely limited production costs.

However, one of the factors that can hinder an even more widespread commercial distribution of such machines lies in the fact that as they have a strong tendency to get dirty with residue retaining liquid from load of spent coffee grounds, they require frequent and meticulous manual cleaning to keep them operating correctly. The need to replace and dispose of the paper filter after each use also involves negative environmental impacts.

SUMMARY OF THE INVENTION

The technical task of the present invention is therefore to realize a coffee machine and a method for preparing a cup of coffee that make it possible to eliminate the cited technical drawbacks of the prior art.

Within the scope of this technical task, an aim of the invention is to realize a coffee machine that offers the user extremely easy, clean and reliable operation. The technical task, as well as the latter and other aims, according to the invention, are achieved by realizing a coffee machine characterized in that it comprises a controller, a boiler for heating a flow of infusion water, a movable infusion unit that comprises an open infusion chamber connected to a dispensing line for dispensing the coffee infusion and an ejection piston slidably supported in the infusion chamber, a supply line for supplying said flow of infusion water to the infusion unit, a closing piston that is engageable for closure of the infusion chamber, said controller being programmed to subject said infusion unit, prior to execution of the infusion process, to a first course of translational movement for closure of the infusion chamber by the closing piston, and to subject said infusion chamber and said ejection piston or only said ejection piston, following execution of the infusion process, to a second course of translational movement in the same direction as the first course of translational movement, for compression of the load of spent coffee grounds against the closing piston and drainage of the liquid contained therein.

In a preferred embodiment of the invention, said infusion unit is supported in a releasable manner by a carriage having a linkage for activating the ejection piston interacting with a cam control means that is supported by a containment body of the infusion unit.

In a preferred embodiment of the invention, said containment body has a window for extraction of the infusion unit.

The present invention further discloses a method for preparing a cup of coffee characterized in that it comprises the following steps:
- supplying a closing piston;
- supplying a movable infusion unit beneath the closing piston, said infusion unit comprising an infusion chamber having an open access mouth facing said closing piston and having an ejection piston slidably supported in the infusion chamber;
- introducing a load of loose coffee grounds into the open infusion chamber;
- subjecting said infusion unit to a first course of translational movement towards said closing piston, said first course being of such an extent that the closing piston closes the infusion chamber as it penetrates therein;
- in the position of the infusion unit thus achieved, sending a flow of water at a temperature ranging between 85° C. and 100° C. and a pressure level ranging between the atmospheric pressure and $2 \times 10^5$ Pa, into the closed infusion chamber for execution of the infusion process;
- at the end of the infusion process, subjecting said infusion chamber and said ejection piston, or only said ejection piston to a second course of translational movement in the same direction as the first course of translational movement, said second course of translational movement being of such an extent that the closing piston compresses the load of spent coffee grounds for drainage of the liquid contained therein, as it penetrates further into the infusion chamber;
- at the end of the drainage process, opening the infusion chamber and extracting the dried load of spent coffee grounds.

Preferably, said first course of translational movement is of such an extent that during the infusion process, the closing piston does not compress the load of loose coffee grounds.

Preferably, said first course of translational movement is of a preset fixed length.

Preferably, the infusion process is carried out within a preset fixed volume of the infusion chamber.

BRIEF DESCRIPTION OF THE DRAWINGS

Further characteristics and advantages of the invention will become more apparent from the description of a preferred, but not exclusive, embodiment of the coffee machine according to the invention, which is illustrated by way of approximate and non-limiting example in the attached drawings, of which.

DETAILED DESCRIPTION OF THE ILLUSTRATED EMBODIMENTS

Figure 1:
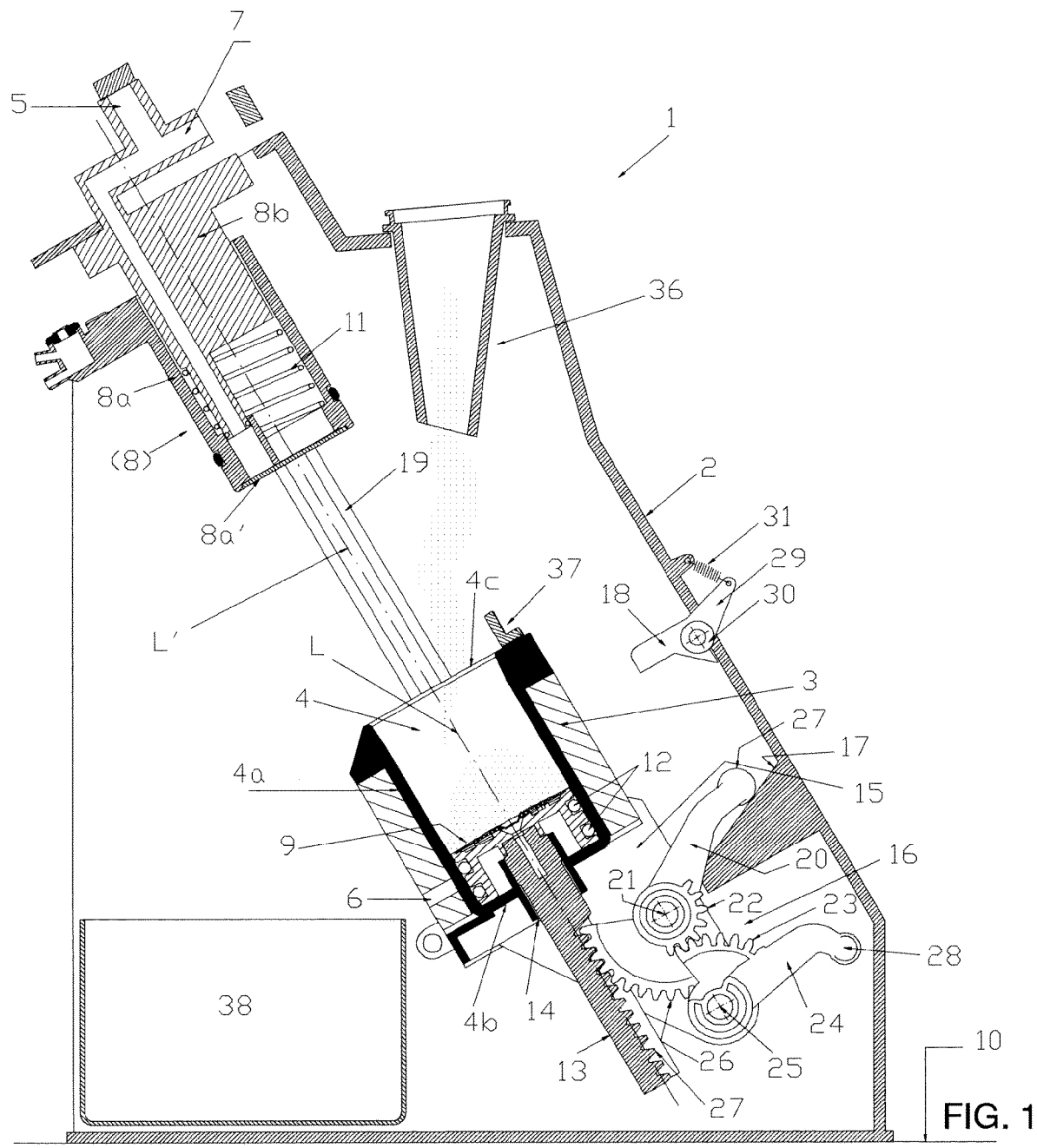
FIG. 1 is a schematic sectional view of the machine with the infusion unit in the position for loading the dose of coffee grounds.
Figure 2:
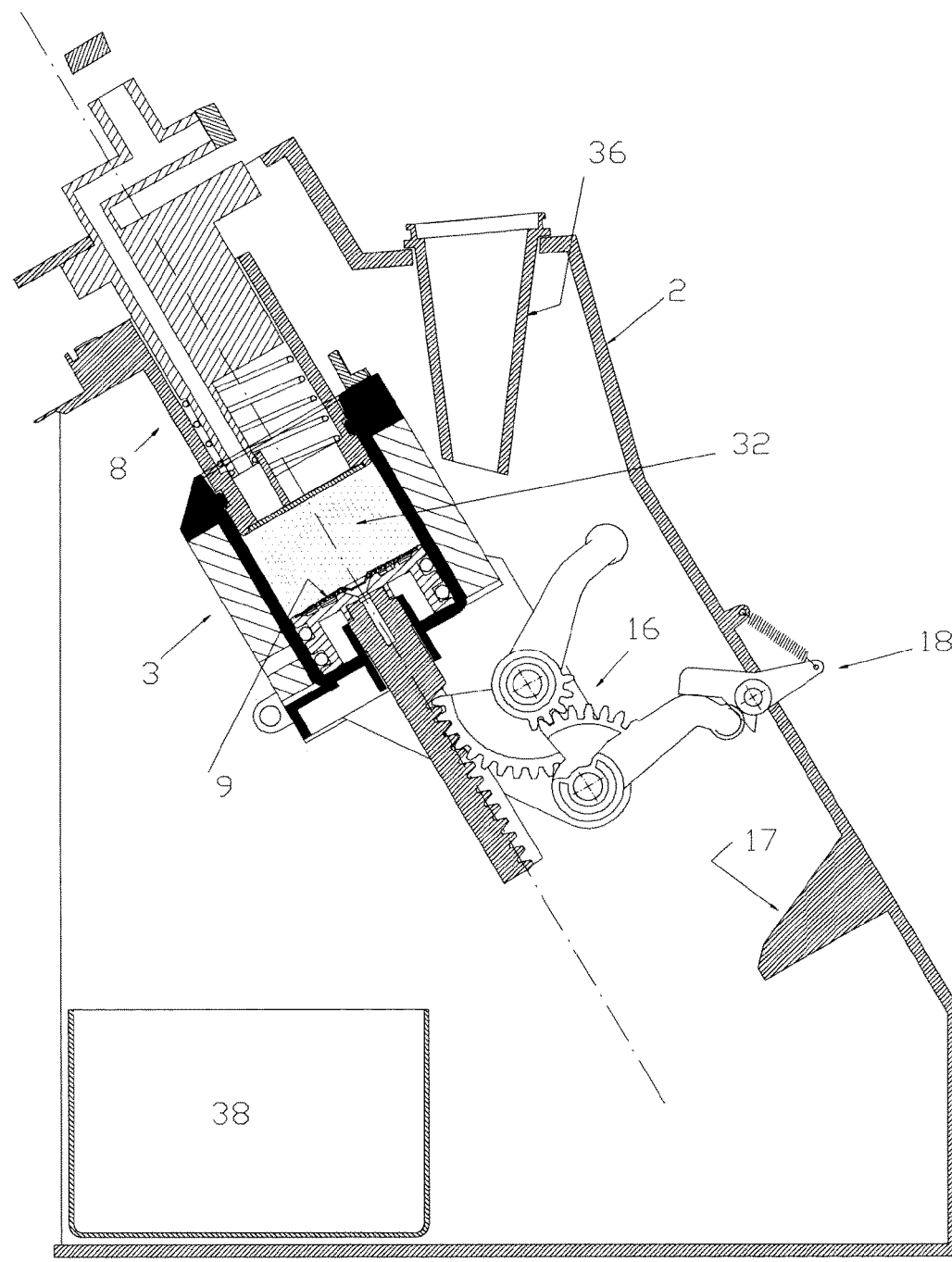
FIG. 2 is a view of the machine appearing in FIG. 1 with the infusion unit in the position reached at the end of the first course of translational movement.
Figure 3:
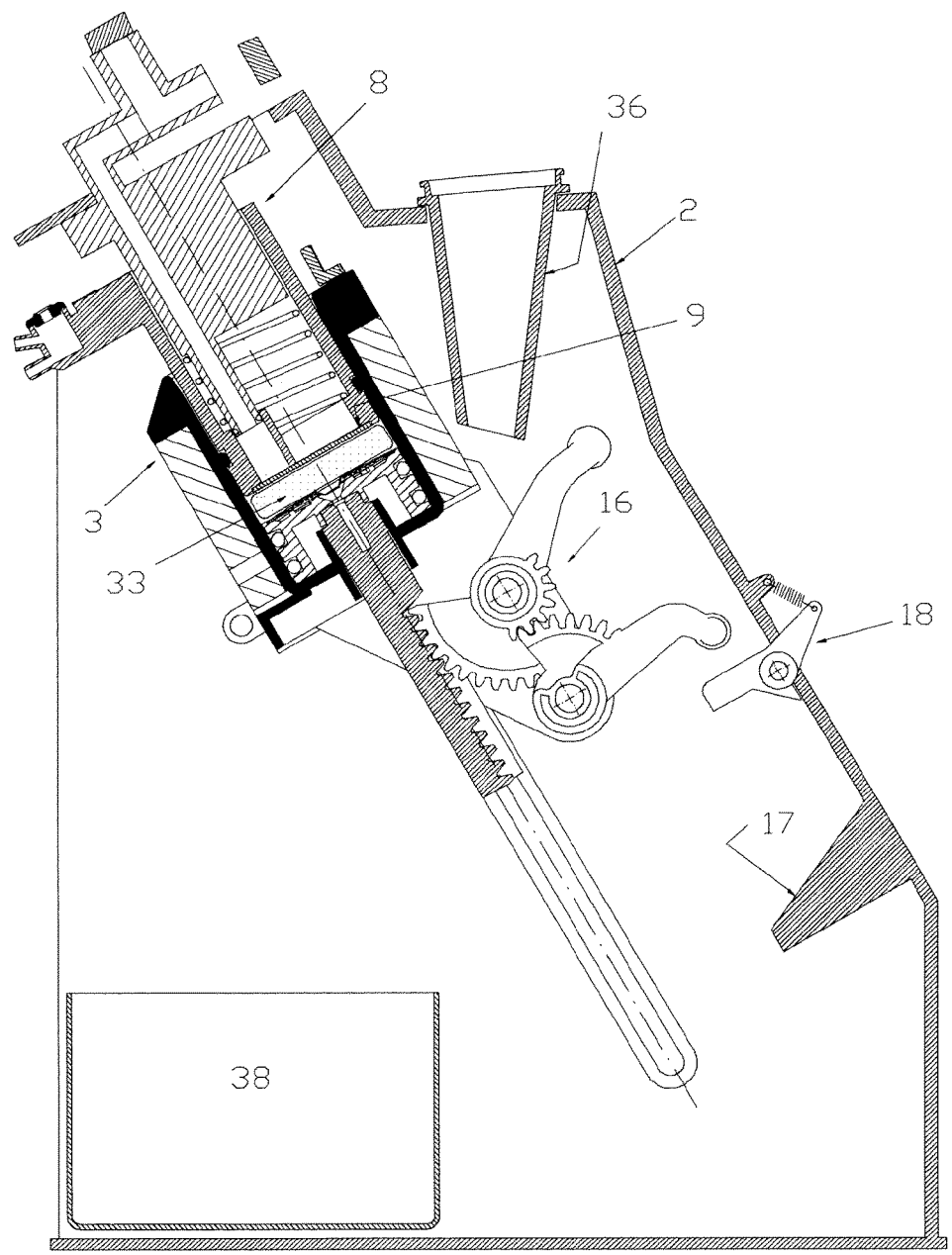
FIG. 3 is a view of the machine appearing in FIG. 1 with the infusion unit in the position reached at the end of the second course of translational movement.
Figure 4:
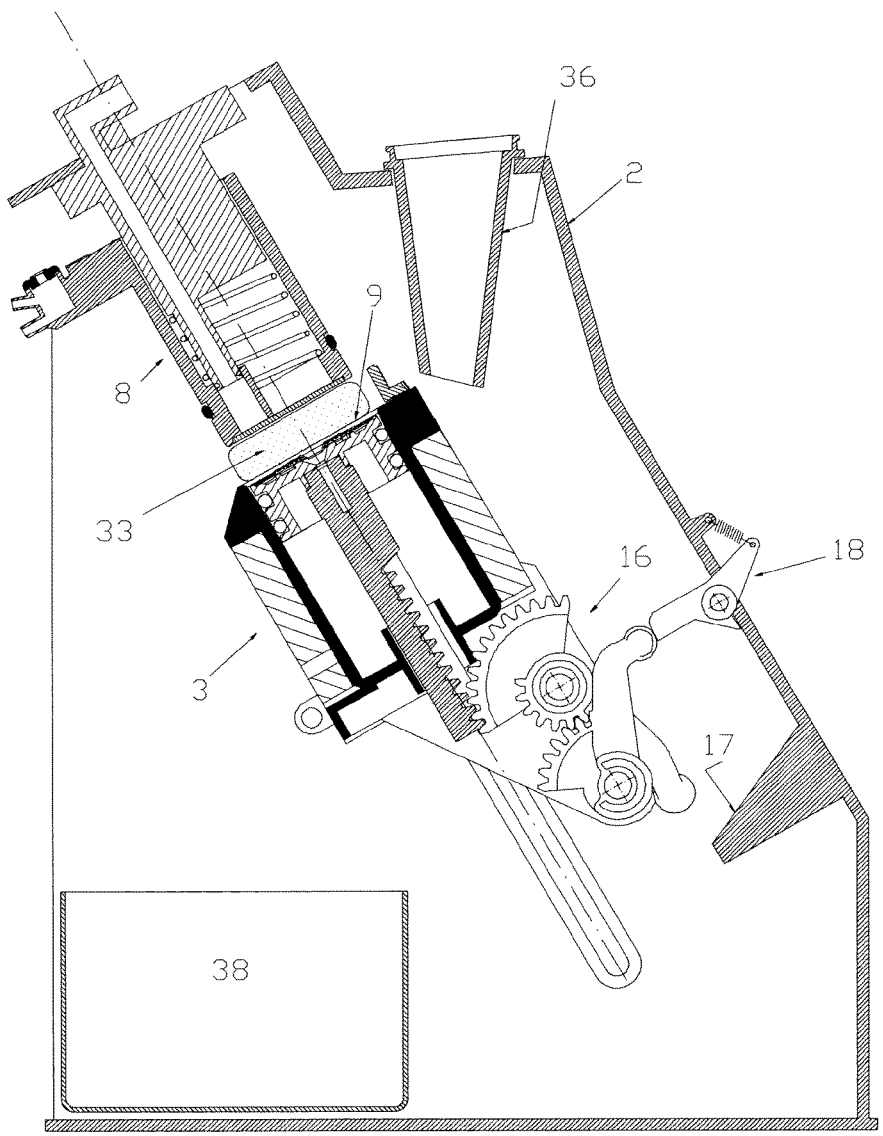
FIG. 4 is a view of the machine appearing in FIG. 1 with the infusion unit in the position for extraction of the load of spent coffee grounds from the infusion chamber.
Figure 5:
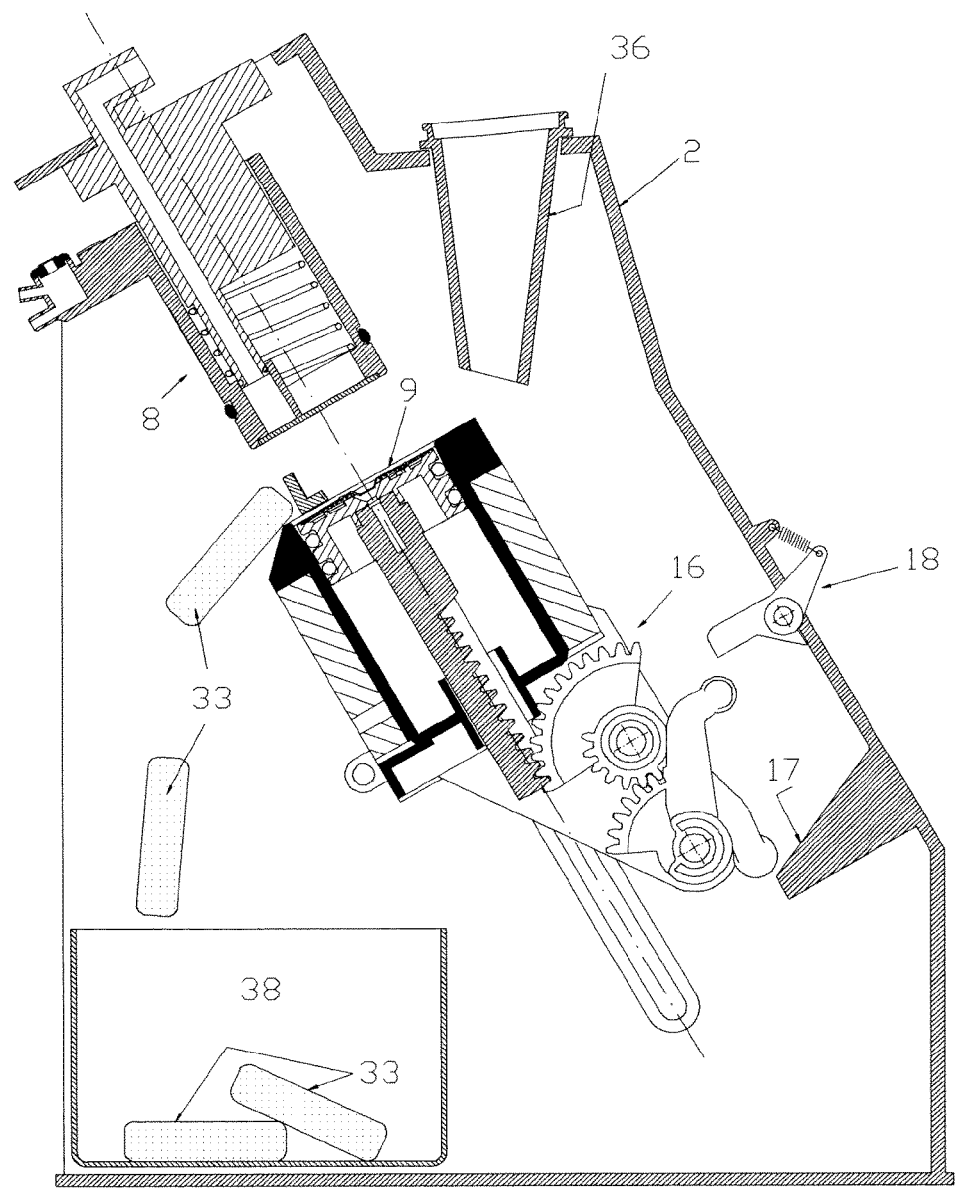
FIG. 5 is a view of the machine appearing in FIG. 1 with the infusion unit in the position for ejection of the load of spent coffee grounds from the infusion chamber.

With reference to the figures cited, a coffee machine is shown and indicated in its entirety by reference number 1.

The coffee machine 1 comprises a frame that delimits a containment body 2 for a movable infusion unit 3, which, in turn, comprises an open infusion chamber 4, where a load of loose coffee grounds 32 can be positioned.

The infusion chamber 4 has a cylindrical lateral wall 4a, a lower base 4b and an upper, open access mouth 4c.

The frame supports a pump (unillustrated) for supplying a flow of infusion water to the infusion unit 3, and a boiler (unillustrated) for heating the flow of infusion water.

The coffee machine 1 further exhibits a controller (unillustrated) that is in communication with the boiler, with the pump and with specific movement means for moving the infusion unit 3.

The hydraulic circuit of the coffee machine 1 further comprises a supply line 5 for supplying the flow of infusion water to the infusion unit 3, a dispensing line 6 for dispensing the coffee infusion, and a drain line 7.

The infusion chamber 4 has its upper, open access mouth 4c facing a closing piston 8 above it that is supported by the frame and serves for closing the infusion chamber 4.

The supply line 5 and the drain line 7 extend within the closing piston 8.

Inside the infusion chamber 4, the infusion unit 3 supports an ejection piston 9 that is translatable coaxially with the axis L of the infusion chamber 4.

The ejection piston 9 has perimeter gaskets 12 for radial sealing with the lateral wall 4a of the infusion chamber 4.

The ejection piston 9 also has a rod 13 that is slidably guided in a through hole 14 in the lower base 4b of the infusion chamber 4.

The rod 13 of the ejection piston 9 extends from the external side of the base 4b of the infusion chamber 4.

The infusion unit 3 is supported in a releasable manner by a carriage 15.

The containment body 2 has a window (unillustrated) for extraction of the infusion unit 3.

Therefore, the infusion unit 3 can be easily inspected outside of the coffee machine 1 when it is released from the carriage 15.

The carriage 15 supports a linkage 16 for activating the ejection piston 9 interacting with a cam control means 17, 18 that is supported by the containment body 2 of the infusion unit 3.

The linkage 16 comprises a first lever 20 having its fulcrum in 21 pivoted to the carriage 15 and having a toothed arc 22 meshing with a toothed arc 23 of a second lever 24 having its fulcrum in 25 pivoted to the carriage 15.

The first lever 20 has an additional toothed arc 26 meshing with a rack 27 afforded on the rod 13 of the ejection piston 9.

In conclusion, the first lever 20 has an arm 27 for taking movement from the cam means 17, which is, in turn, made up of a cam surface afforded by the containment body 2.

The second lever 24, in turn, has an arm 28 for taking movement from the cam means 18, which is, in turn, made up of a cam surface afforded on an element 29 having its fulcrum in 30 pivoted to the containment body 2 and oscillating in contrast to and by action of a spring 31.

The infusion unit 3 is movable in translational motion along a rectilinear trajectory L that is inclined with respect to the rest plane 10 of the coffee machine 1.

The movement means for moving the infusion unit 3 comprises a motorized endless screw 19 oriented parallel to the rectilinear trajectory and engaged in a female thread (unillustrated) integral with the carriage 15.

Depending on the direction of rotation, the rotation of the endless screw 19 on itself results in the ascent or descent of the infusion unit 3.

The infusion chamber 4 is oriented coaxially with respect to the rectilinear trajectory L' of the infusion unit 3.

The orientation of the infusion chamber 4 can be fixed, as shown, or the possibility of rotation of the infusion chamber 4 can be comprised at the lower position of the infusion unit 3, for example so as to be arranged with the axis orthogonal to the rest plane 10 so as to facilitate the procedure for loading the dose of loose coffee grounds.

The orientation of the closing piston 8 is fixed coaxially with respect to the rectilinear trajectory L' of the infusion unit 3.

The closing piston 8 comprises an internal fixed part 8b for supporting and guiding an external part 8a that is movable in contrast to and by action of a spring 11 in the direction of the rectilinear trajectory of the infusion unit 3.

The supply line 5 and the drain line 7 are connected with through holes 8a' present at the lower end of the external part 8a of the closing piston 8.

According to a salient aspect of the invention, the controller is programmed to subject the infusion unit 3, prior to execution of the infusion process, to a first course of translational movement for closure of the infusion chamber 4 by the closing piston.

The controller is also programmed to subject the infusion unit 3 in its entirety (thus the infusion chamber 4 and the ejection piston 9) or only the ejection piston 9 of the infusion unit 3, following execution of the infusion process, to a second course of translational movement in the same direction as the first course of translational movement, for compression of the load of spent coffee grounds 33 against the closing piston 8 and drainage of the liquid contained therein towards the drain line 7.

In the case described and illustrated herein by way of example, but as stated, not necessarily, the infusion chamber 4 and the ejection piston 9 jointly execute this second course of translational movement.

According to another salient aspect of the invention, by effect of the first course of translational movement, the closing piston 8 penetrates into the infusion chamber 4 to such a limited extent that it does not compress the load of loose coffee grounds 32 during the infusion process.

Therefore, an extension of the course of movement of the infusion unit 3 or of a component thereof is advantageously provided, with respect to the course of movement strictly necessary for closure of the infusion chamber 4 and owing to which, the load of loose spent coffee grounds 33 is also dried.

The load of spent coffee grounds 33 can thus be extracted and then ejected without it contaminating the internal parts of the coffee machine 1, which ultimately remains entirely clean.

Advantageously, the first course of translational movement is of a preset length that remains fixed for each infusion cycle.

Advantageously, the infusion process is carried out within a preset volume of the infusion chamber that remains fixed for each infusion cycle.

This solution affords simplified operation of the infusion unit 3.

The second course of translation movement can instead be variable, as it is influenced by external variables such as the amount constituting the load of loose coffee grounds.

In particular, an actuator (unillustrated) for activating a microswitch (unillustrated) conveniently arranged in a fixed position and serving for generating a signal marking the end of the second course of translational movement of the infusion unit 3 can be integral with the movable part 8a of the closing piston 8.

In the case described and illustrated herein by way of example, in which the second course of translational movement is executed by the entire infusion unit 3, operation of the coffee machine 1 is substantially as follows:

The infusion unit 3 is at its lower travel limit stop, in which the upper access mouth 4c of the infusion chamber 4 is vertically aligned below a hopper 36 for loading the load of coffee grounds 32.

The ejection piston 9 is in its retracted position towards the bottom 4b of the infusion chamber 4.

The user starts an operating cycle of the coffee machine 1 by using a specific control button (unillustrated).

The hopper 36 releases a load of coffee grounds 32, which enters the infusion chamber 4 by virtue of gravity.

The controller then activates the endless screw 19 for a predetermined number of turns such as to have the infusion unit 3 carry out the first course of translational movement.

The controller then commands the opening of a shut-off valve (unillustrated) located on the supply line 5 and the closing of a shut-off valve (unillustrated) located on the drain line 7.

The controller activates the feed pump and the boiler so as to supply a flow of infusion water to the infusion unit 3.

Optimal infusion conditions correspond to a flow of infusion water having a pressure level ranging between the atmospheric pressure and $2\times10^5$ Pa, and a temperature ranging between 85° C. and 100° C.

By way of example, the flow of infusion water has a temperature of 90° C. and a pressure level of $1.4\times10^5$ Pa.

The flow rate of the flow of infusion water is preferably within the range of 100 cc/min to 200 cc/min, by way of example a flow rate of 150 cc/min.

At the end of the infusion process, the controller commands the closing of the shut-off valve located on the supply line 5, the opening of the shut-off valve located on the drain line 7, and again activates the endless screw 19 in the same direction of rotation so as to have the infusion unit 3 carry out the second course of translational movement.

During the second course of translational movement, the volume of the infusion chamber 4 decreases in that the closing piston 8 approaches the ejection piston 9 and the load of spent coffee grounds 3 is compressed.

The liquid contained in the load of spent coffee grounds 33 is drained into the drain line 7.

At the end of the drying process for drying the load of spent coffee grounds 33, the controller reactivates the endless screw 19 with an inverted direction of rotation so as to disengage the infusion unit 3 from the closing piston 8 and bring it back to its initial position.

During a first stage of the descent of the infusion unit 3, the linkage 16 is activated by the effect of the interaction of the cam 18 with the arm for taking movement 28 and the ejection piston rises from the bottom 4b of the infusion chamber 4 until it brings the load of spent and dried coffee grounds 33 to the level of the access mouth 4c.

In a subsequent part of the descent of the infusion unit 3, a cam device (unillustrated) also triggered by the movement of the infusion unit 3, activates a scraper 37 positioned laterally to the access mouth 4c of the infusion chamber 4. The scraper sweeps the access mouth 4c of the infusion chamber 4, making the load of spent and dried coffee grounds 33 drop into a specific container 38.

In a subsequent part of the descent of the infusion unit 3, the linkage 16 is activated by the effect of the interaction of the cam 17 with the arm for taking movement 27 and the ejection piston 9 retracts towards the bottom of the infusion chamber 4. As stated, to dry the load of coffee grounds an extra course is used in the same direction, with respect to the course for closing the infusion chamber, it being possible for said extra course to be executed jointly by the infusion chamber and by the ejection piston or selectively by the ejection piston.

In a variant of the invention, the final volume of the infusion chamber for execution of the infusion process can be calibrated, after the engagement of the infusion chamber with the closing piston and the infusion chamber has stopped, by partial lifting of the ejection piston from the bottom of the infusion chamber. Starting from this configuration with the ejection piston slightly raised from the bottom of the infusion chamber, the extra course defined hereinabove for drying the load of spent coffee grounds is then executed.

In a variant of the invention, the extra course carried out to dry the load of spent coffee grounds can take place following other courses, including courses not in the same direction, which can be useful for opening or closing sectors of the hydraulic circuit or for releasing levers that enable subsequent movements of the system.

In a variant of the invention, the liquid drained from the load of spent coffee grounds can be conveyed directly into a cup instead of towards a specific draining circuit.

The use of the coffee machine of the invention has been found to be extremely advantageous as a percolator for producing a cup of coffee similar to drip or American coffee.

The coffee machine and the method for preparing a cup of coffee thus conceived are susceptible to numerous modifications and variants, all of which falling within the scope of the inventive concept. Moreover, all details may be replaced with other technically equivalent elements.

The materials used, as well as the dimensions, may in practice be of any type, according to needs and the state of the art.

The invention claimed is:

1. A coffee machine (1) comprising:
   a controller,
   a boiler for heating a flow of infusion water,
   a movable infusion unit (3) that comprises a carriage (15), an open infusion chamber (4) connected to a dispensing line (6) for dispensing the coffee infusion, and an ejection piston (9) slidably supported in the infusion chamber (4),
   a supply line (5) for supplying said flow of infusion water to the infusion unit (3), a closing piston (8) that is engageable for closure of the infusion chamber (4), a single endless screw (19) driven by a single driving motor, the single endless screw (19) engaging the movable infusion unit (3) via the carriage (15), said controller being programmed to:

subject said infusion unit (3), prior to execution of an infusion process, to a first course of translational movement for closure of the infusion chamber (4) by the closing piston (8), the first course of translational movement being implemented by the infusion unit (3) engagingly communicating with the single endless screw (19) driven in a first direction of rotation by the single driving motor, where a length of the first course of translational movement, and therefore a subsequent volume of the closed infusion chamber (4), is configured to be variable, where the length of the first course of translational movement is provided by a control of the first driving motor;

subject said infusion chamber (4) together with said ejection piston (9) housed therein, or only said ejection piston (9), following execution of the infusion process, to a second course of translational movement, in the same direction as the first course of translational movement, for compression and drying of a load of spent coffee grounds (33) against the closing piston (8) and drainage of the liquid contained therein, the second course of translational movement being implemented by the infusion unit (3) engagingly communicating with the single endless screw (19) driven in the first direction of rotation by the single driving motor, wherein a length of the second course of translational movement, and therefore a subsequent volume of the closed infusion chamber (4), and a degree to which the length of the second course of translational movement involves said infusion chamber (4) together with said ejection piston (9) housed therein, or only said ejection piston (9), is configured to be variable, thereby varying a compression, or squeezing, force on the load of spent coffee grounds (33) in the infusion chamber (4), where the length of the second course of translational movement is provided by the control of the first driving motor; and subject said infusion unit (3), following execution of the compression and drying of the load of spent coffee grounds (33), to a third course of translational movement, in a direction opposite the first and the second course of translational movement, to disengage the infusion chamber (4) from the closing piston (8), the third course of translational movement being implemented by the infusion unit (3) engagingly communicating with the single endless screw (19) driven in a second, opposite direction of rotation by the single driving motor, where a length of the third course of translational movement is provided by the control of the first driving motor;

where, during the third course of translational movement of the infusion unit (3), a linkage (16), moving with and supported by the carriage (15), is activated, upon interaction of the linkage (16) with one or more cams (17, 18) of the coffee machine (1), to slidably translate the ejection piston (9) from a bottom (4b) portion, to a top, access mouth (4c) portion, of the infusion chamber (4);

where the linkage (16) comprises rack and pinion gearing, the rack and pinion clearing including a toothed rack (27), afforded on a rod (13) of the election piston (9), and one or more levers (20, 24), each pivoted to the carriage (15), and each having one or more toothed arcs (22, 23, 26) thereon; where interaction of the one or more levers (20, 24) with the one or more cams (17, 18) results in toothed arc (26) communication with the toothed rack (27) to slidably translate the election piston (9), in a translational direction opposite that of the infusion unit (4) during the third course of translational movement, from the bottom (4b) portion, to the top, access mouth (4c) portion, of the infusion chamber (4), whereby the ejection piston (9), during slidable translation, brings the load of spent coffee grounds from the bottom (4b) portion, to a level of the top, access mouth (4c) portion, of the infusion chamber (4).

2. The coffee machine (1) according to claim 1, wherein said containment body (2) has a window for extraction of the infusion unit (3).

3. The coffee machine (1) according to claim 1, wherein the coffee machine (1) is configured, following execution of the infusion process, to drain the liquid contained in said infusion chamber (4), during operation of said second course of translational movement, through an opening of only one valve, as programmed by said controller, to access a drain line (7) for the liquid drainage of said infusion chamber (4).

* * * * *